US012657242B2

(12) United States Patent
Wang et al.

(10) Patent No.: US 12,657,242 B2
(45) Date of Patent: **\*Jun. 16, 2026**

(54) DATA PROCESSING METHOD, APPARATUS AND DEVICE AND STORAGE MEDIUM

(71) Applicant: Beijing Zitiao Network Technology Co., Ltd., Beijing (CN)

(72) Inventors: Qi Wang, Beijing (CN); Ge Zhang, Beijing (CN); Lei Wang, Beijing (CN); Zifeng Zhao, Beijing (CN); Lan Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/396,520

(22) Filed: Dec. 26, 2023

(65) Prior Publication Data

US 2024/0143663 A1 May 2, 2024

Related U.S. Application Data

(63) Continuation of application No. PCT/CN2023/086512, filed on Apr. 6, 2023.

(30) Foreign Application Priority Data

Apr. 20, 2022 (CN) .......................... 202210420168.2

(51) Int. Cl.
G06F 16/9035 (2019.01)
G06F 16/904 (2019.01)
G06F 16/908 (2019.01)

(52) U.S. Cl.
CPC ........ G06F 16/9035 (2019.01); G06F 16/904 (2019.01); G06F 16/908 (2019.01)

(58) Field of Classification Search
CPC .. G06F 16/904; G06F 16/908; G06F 16/9035; G06F 16/58
See application file for complete search history.

(56) References Cited

U.S. PATENT DOCUMENTS 9,305,084 B1 * 4/2016 Mccann et al. ... G06F 17/30705
9,524,077 B1 * 12/2016 Pattan et al. .......... G06F 3/0482
(Continued)

FOREIGN PATENT DOCUMENTS

CN 102968446 A 3/2013
CN 103116588 A 5/2013
(Continued)

OTHER PUBLICATIONS

Notice of Grant dated Nov. 14, 2022 in CN Appl. No. 202210420168. 2, English translation (6 pages).
(Continued)

*Primary Examiner* — Neveen Abel Jalil

(57) ABSTRACT

The present disclosure provides a data processing method, apparatus and device and a storage medium. The method comprises: displaying a recommended content adjustment page of a target application, and displaying at least one content type tag on the recommended content adjustment page; in response to a trigger operation for an adjustment entry of a target content type tag in the at least one content type tag, displaying an adjustment panel corresponding to the target content type tag on the recommended content adjustment page; and in response to a selection operation for a target recommendation intensity level in the plurality of recommendation intensity levels, establishing a corresponding relationship between the target content type tag and the target recommendation intensity level which is used for (Continued)

adjusting the recommendation amount of the target application for the content type corresponding to the target content type tag.

13 Claims, 12 Drawing Sheets

(56) References Cited

U.S. PATENT DOCUMENTS

| | | | |
|---|---|---|---|
| 10,599,390 B1 * | 3/2020 | Brahmbhatt | G06F 3/0482 |
| 11,675,485 B2 * | 6/2023 | Sun | G06F 16/9558 |
| | | | 715/760 |
| 11,748,798 B1 * | 9/2023 | Agrawal et al. | G06Q 30/0633 |
| 2002/0186257 A1 * | 12/2002 | Cadiz | G06F 16/9535 |
| | | | 715/838 |
| 2008/0126990 A1 * | 5/2008 | Kumar | G06Q 10/10 |
| | | | 715/835 |
| 2009/0003797 A1 * | 1/2009 | Nash | G06F 16/58 |
| | | | 386/250 |
| 2009/0271391 A1 * | 10/2009 | Kawale | G06F 16/9535 |
| | | | 707/999.005 |
| 2009/0300547 A1 * | 12/2009 | Bates et al. | G06F 17/30 |
| 2010/0131844 A1 | 5/2010 | Wohlert | |
| 2010/0161620 A1 * | 6/2010 | Lamere et al. | G06F 7/06 |
| | | | 707/749 |
| 2011/0032373 A1 | 2/2011 | Forutanpour et al. | |
| 2011/0093337 A1 * | 4/2011 | Granit | G06Q 30/0255 |
| | | | 705/14.66 |
| 2011/0282888 A1 * | 11/2011 | Koperski | G06F 16/951 |
| | | | 707/E17.061 |
| 2012/0072852 A1 | 3/2012 | Svendsen et al. | |
| 2012/0209850 A1 * | 8/2012 | Kikin-Gil | G06F 16/338 |
| | | | 707/738 |
| 2013/0031187 A1 * | 1/2013 | Rajesh | H04L 67/63 |
| | | | 709/204 |
| 2013/0215313 A1 | 8/2013 | Maeda | |
| 2014/0164365 A1 * | 6/2014 | Graham | G06Q 50/01 |
| | | | 707/723 |
| 2014/0173501 A1 * | 6/2014 | Wu | G06F 3/0481 |
| | | | 715/781 |
| 2014/0280232 A1 * | 9/2014 | Chidlovskii | G06F 16/58 |
| | | | 707/749 |
| 2014/0324965 A1 | 10/2014 | Ralston et al. | |
| 2014/0331142 A1 * | 11/2014 | Li | H04L 67/02 |
| | | | 715/738 |
| 2017/0004700 A1 | 1/2017 | Kim | |
| 2017/0153608 A1 | 6/2017 | Ueda et al. | |
| 2017/0169349 A1 * | 6/2017 | Qi | G06Q 30/0631 |
| 2018/0246588 A1 * | 8/2018 | Bostick | G06F 3/0482 |
| 2019/0034805 A1 * | 1/2019 | Cohn-Zur et al. | G06N 5/02 |
| 2019/0075176 A1 * | 3/2019 | Nguyen | A63F 13/65 |
| 2019/0179966 A1 | 6/2019 | Cheng et al. | |
| 2019/0205402 A1 * | 7/2019 | Sernau | G06Q 50/01 |
| 2019/0266185 A1 * | 8/2019 | Rao | H04N 21/4758 |
| 2020/0169789 A1 * | 5/2020 | Kim | H04N 21/45 |
| 2020/0183920 A1 * | 6/2020 | Achuthan | G06F 3/0488 |
| 2020/0387914 A1 * | 12/2020 | Rathod | G06F 3/048 |
| 2021/0200805 A1 * | 7/2021 | Wang | G06F 16/908 |
| 2021/0248198 A1 * | 8/2021 | Chen | G06Q 30/0255 |
| 2022/0012268 A1 * | 1/2022 | Ghoshal | G06F 16/285 |
| 2022/0058694 A1 * | 2/2022 | Garthwaite | G06Q 30/0277 |
| 2022/0150591 A1 * | 5/2022 | Miller | H04N 21/47202 |
| 2022/0245161 A1 * | 8/2022 | Ahmed | G06N 20/00 |
| 2022/0414168 A1 * | 12/2022 | Gomes Pereira | G06F 16/9035 |
| 2023/0188577 A1 * | 6/2023 | Venkiteswaran | G06F 16/904 |
| | | | 709/204 |
| 2023/0319165 A1 * | 10/2023 | Govan | G06Q 30/0241 |
| | | | 709/217 |
| 2024/0161065 A1 * | 5/2024 | Balasia | G06Q 10/1053 |

FOREIGN PATENT DOCUMENTS

| | | |
|---|---|---|
| CN | 104182515 A | 12/2014 |
| CN | 107832468 A | 3/2018 |
| CN | 107959865 A | 4/2018 |
| CN | 109255715 A | 1/2019 |
| CN | 110751526 A | 2/2020 |
| CN | 111953790 A | 11/2020 |
| CN | 112465539 A | 3/2021 |
| CN | 108734446 A | 8/2021 |
| CN | 113377999 A | 9/2021 |
| CN | 113590928 A | 11/2021 |
| CN | 113609375 A | 11/2021 |
| CN | 113627985 A | 11/2021 |
| CN | 113806639 A | 12/2021 |
| CN | 113918736 A | 1/2022 |
| CN | 114282126 A | 4/2022 |
| CN | 114780842 A | 7/2022 |
| CN | 115129985 A | 9/2022 |
| CN | 115145455 A | 10/2022 |
| JP | 2013501977 A | 1/2013 |
| JP | 2013172282 A | 9/2013 |
| JP | 2017102648 A | 6/2017 |
| JP | 7608706 B2 | 1/2025 |
| WO | 2021016760 A1 | 2/2021 |

OTHER PUBLICATIONS

First Office Action dated Oct. 10, 2022 in CN Appl. No. 202210420168. 2, English translation (12 pages).

International Search Report and Written Opinion in PCT Appl. No. PCT/CN2023/086512, English translation (11 pages).

Notice of Reasons for Refusal issued May 21, 2024 in JP Appl. No. 2023579688, English translation (6 pages).

Bostandjiev S., et al., "TasteWeights: A Visual Interactive Hybrid Recommender System," Proceedings of the 2022 ACM Southeast Conference, ACMPUB27, Sep. 9, 2012, pp. 35-42.

Extended European Search Report for European Application No. 23791038.5, mailed Nov. 13, 2024, 9 pages.

* cited by examiner

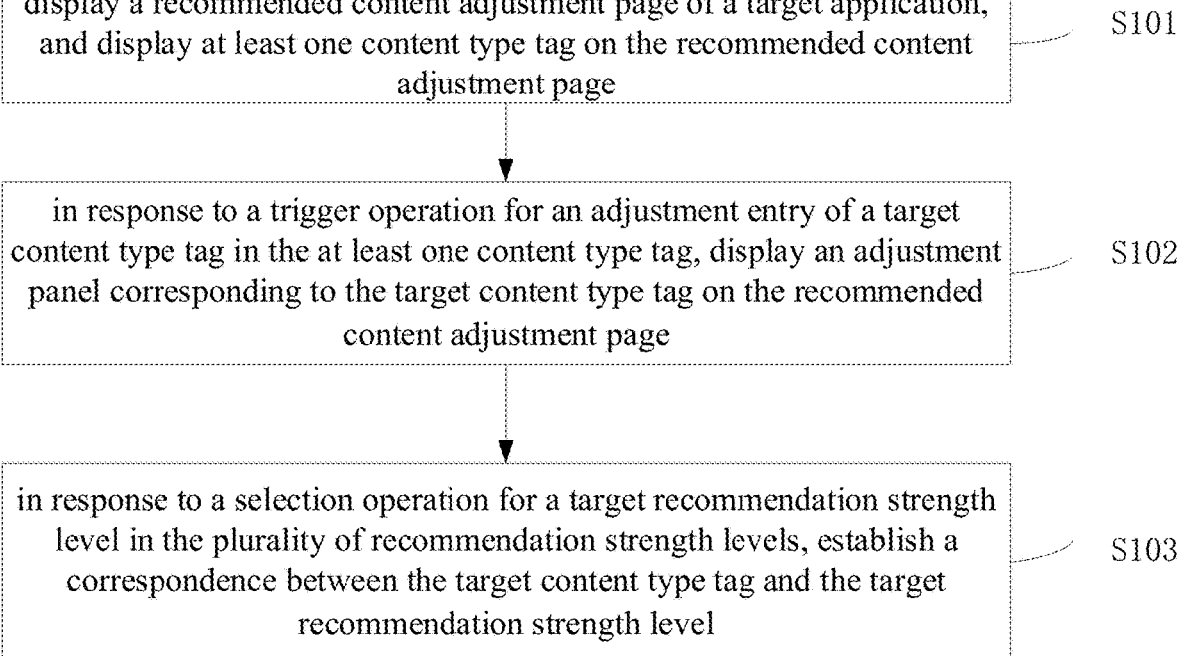

display a recommended content adjustment page of a target application, and display at least one content type tag on the recommended content adjustment page ⟶ S101 in response to a trigger operation for an adjustment entry of a target content type tag in the at least one content type tag, display an adjustment panel corresponding to the target content type tag on the recommended content adjustment page ⟶ S102 in response to a selection operation for a target recommendation strength level in the plurality of recommendation strength levels, establish a correspondence between the target content type tag and the target recommendation strength level ⟶ S103

Fig. 1

DATA PROCESSING METHOD, APPARATUS AND DEVICE AND STORAGE MEDIUM

CROSS-REFERENCE TO RELATED APPLICATIONS

The present application is based on and claims the priority to the PCT application No. PCT/CN2023/086512 filed on Apr. 6, 2023 and the Chinese patent application No. 202210420168.2 filed on Apr. 20, 2022. The disclosure of each of these applications is incorporated herein by reference in its entirety.

TECHNICAL FIELD

The present disclosure relates to the field of data processing, and in particular to a data processing method, apparatus and device, and a storage medium.

BACKGROUND

With the development of Internet technology, content recommendation functions have been widely used in various applications.

The content recommendation function involved in the current applications only supports a single setting for content types that the users are interested in. For example, for the same content type, such as travel-type videos, there are only two recommendation modes based on users' content recommendation settings. One is to recommend the travel-type videos to users, and the other is not to recommend the travel-type videos to users. It can be seen that the current adjustment granularity of content recommendation modes is relatively coarse, which cannot meet the growing needs of users for content recommendation.

SUMMARY

In order to solve the above technical problems, embodiments of the present disclosure provide a data processing method.

In a first aspect, the present disclosure provides a data processing method, including:

displaying a recommended content adjustment page of a target application, and displaying at least one content type tag on the recommended content adjustment page, where the at least one content type tag is respectively provided with an adjustment entry, and the content type tags are used to identify content types recommended by the target application;

in response to a trigger operation for an adjustment entry of a target content type tag in the at least one content type tag, displaying an adjustment panel corresponding to the target content type tag on the recommended content adjustment page, where the adjustment panel is provided with a plurality of recommendation strength levels; and in response to a selection operation for a target recommendation strength level in the plurality of recommendation strength levels, establishing a correspondence between the target content type tag and the target recommendation strength level, where the target recommendation strength level is used to adjust the recommendation amount of the target application for a content type corresponding to the target content type tag.

In a second aspect, the present disclosure provides a data processing apparatus, including:

a first display module, which is used for displaying a recommended content adjustment page of a target application, and displaying at least one content type tag on the recommended content adjustment page, where the at least one content type tag is respectively provided with an adjustment entry, and the content type tags are used to identify content types recommended by the target application;

a second display module, which is used for displaying, in response to a trigger operation for an adjustment entry of a target content type tag in the at least one content type tag, an adjustment panel corresponding to the target content type tag on the recommended content adjustment page, where the adjustment panel is provided with a plurality of recommendation strength levels; and an establishment module, which is used for establishing, in response to a selection operation for a target recommendation strength level in the plurality of recommendation strength levels, a correspondence between the target content type tag and the target recommendation strength level, where the target recommendation strength level is used to adjust the recommendation amount of the target application for a content type corresponding to the target content type tag.

In a third aspect, the present disclosure provides a computer-readable storage medium storing instructions which, when run on a terminal device, cause the terminal device to implement the above method.

In a fourth aspect, the present disclosure provides a data processing device, including a memory, a processor, and a computer program that is stored in the memory and executable on the processor, where when the processor executes the computer program, the above method is implemented.

In a fifth aspect, the present disclosure provides a computer program product, including a computer program/instruction, where when the computer program/instruction is executed by a processor, the above method is implemented.

BRIEF DESCRIPTION OF THE DRAWINGS

The accompanying drawings herein, which are incorporated in and constitute a part of this specification, illustrate embodiments consistent with the present disclosure and together with the description, serve to explain the principles of the present disclosure.

In order to more clearly illustrate the embodiments of the present disclosure or the technical solutions in the related art, the accompanying drawings needed to be used in the description of the embodiments or the related art will be briefly introduced below. It will be apparent to those of ordinary skill in the art that other accompanying drawings can be obtained based on these accompanying drawings without creative effects.

FIG. 1 is a flowchart of a data processing method provided in an embodiment of the present disclosure;

DETAILED DESCRIPTION

Figure 2:
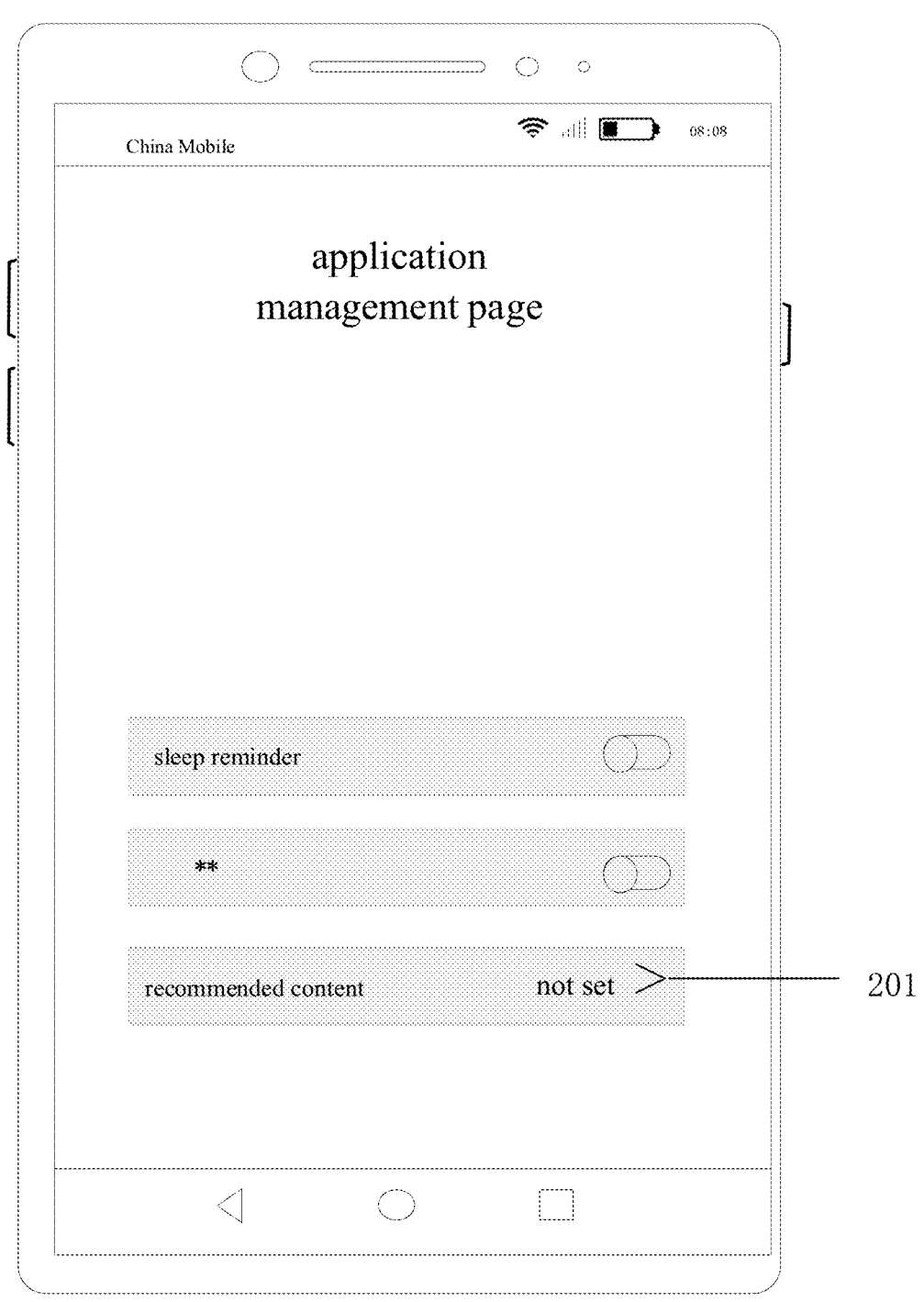
FIG. 2 is a schematic diagram of an application management page of a target application provided in an embodiment of the present disclosure.

In order to understand the above objects, features and advantages of the present disclosure more clearly, the solutions of the present disclosure will be further described below. It should be noted that, as long as there is no conflict, the embodiments of the present disclosure and the features in the embodiments can be combined with each other.

Many specific details are set forth in the following description to fully understand the present disclosure, but the present disclosure can also be implemented in other ways different from those described here. Obviously, the embodiments in the description are only part of the embodiments of the present disclosure, not all of them.

The content recommendation function involved in the current applications only supports a single setting for content types that the users are interested in. For example, for the same content type, such as travel-type videos, there are only two recommendation modes based on users' content recommendation settings. One is to recommend the travel-type videos to users, and the other is not to recommend the travel-type videos to users. It can be seen that the current adjustment granularity of content recommendation modes is relatively coarse, which cannot meet the growing needs of users for content recommendation.

To this end, embodiments of the present disclosure provide a data processing method, including: first, displaying a recommended content adjustment page of a target application, and displaying at least one content type tag on the recommended content adjustment page, where the content type tags are provided with adjustment entries, and the content type tags are used to identify content types recommended by the target application; in response to a trigger operation for an adjustment entry of a target content type tag in the at least one content type tag, displaying an adjustment panel corresponding to the target content type tag on the recommended content adjustment page, where the adjustment panel is provided with a plurality of recommendation strength levels; and then, in response to a selection operation for a target recommendation strength level in the plurality of recommendation strength levels, establishing a correspondence between the target content type tag and the target recommendation strength level, where the target recommendation strength level is used to adjust the recommendation amount of the target application for a content type corresponding to the target content type tag. It can be seen, according to the embodiments of the present disclosure, that different recommendation strength levels are set for the content type tags, and the recommendation amount of the target application for content types corresponding to the content type tags is adjusted, so that finer-grained adjustment for content recommendation modes of the target application is realized, and the growing needs of users for content recommendation are met.

Based on this, an embodiment of the present disclosure provides a data processing method. Referring to FIG. 1, which is a flowchart of a data processing method provided in an embodiment of the present disclosure, the method includes:

S101: display a recommended content adjustment page of a target application, and display at least one content type tag on the recommended content adjustment page.

The at least one content type tag is respectively provided with an adjustment entry, and the content type tags are used to identify content types recommended by the target application.

In some embodiments of the present disclosure, the target application is an application used to implement a certain function. For example, the target application may be a video recommendation application, a news application, an education application, a live streaming application, a music recommendation application, etc. The type of the target application is not limited in the embodiment of the present disclosure.

In some embodiments of the present disclosure, the content type tags are used to identify content types recommended by the target application. The content type tags may include film and television clips, music, food, character snapshots, etc. For example, assuming that the target application is a video application, a music tag is used to identify music type videos recommended by the video application, and a food tag is used to identify food type videos recommended by the video application.

In some embodiments of the present disclosure, at least one content type tag is displayed on the recommended content adjustment page, where each content type tag is provided with a corresponding adjustment entry. By triggering the adjustment entries corresponding to the content type tags, a user can adjust the recommendation amount of the target application for the content types corresponding to the content type tags.

In an optional implementation, before displaying the recommended content adjustment page of the target application, an application management page of the target application is displayed, where the application management page is provided with a recommended content adjustment entry; accordingly, in response to a triggering operation for the recommended content adjustment entry, the recommended content adjustment page of the target application is displayed.

In some embodiments of the present disclosure, the application management page of the target application may be a page that displays at least one setting function of a certain target application. For example, the application management page of the target application may be a page of a video recommendation application that includes at least one setting function. In the embodiment of the present disclosure, the application management page is provided with a recommended content adjustment entry for the recommended content adjustment function, and the application management page may also be provided with adjustment entries corresponding to a sleep reminder function, etc. Referring to FIG. 2, which is a schematic diagram of an application management page of a target application provided in an embodiment of the present disclosure, by clicking on a recommended content adjustment entry 201 set on the application management page, the user can jump from the application management page of the target application to the recommended content adjustment page of the target application. In practical applications, when using the recommended content adjustment function for the first time, the user displays a "not set" status at the recommended content adjustment entry.

Figure 3:
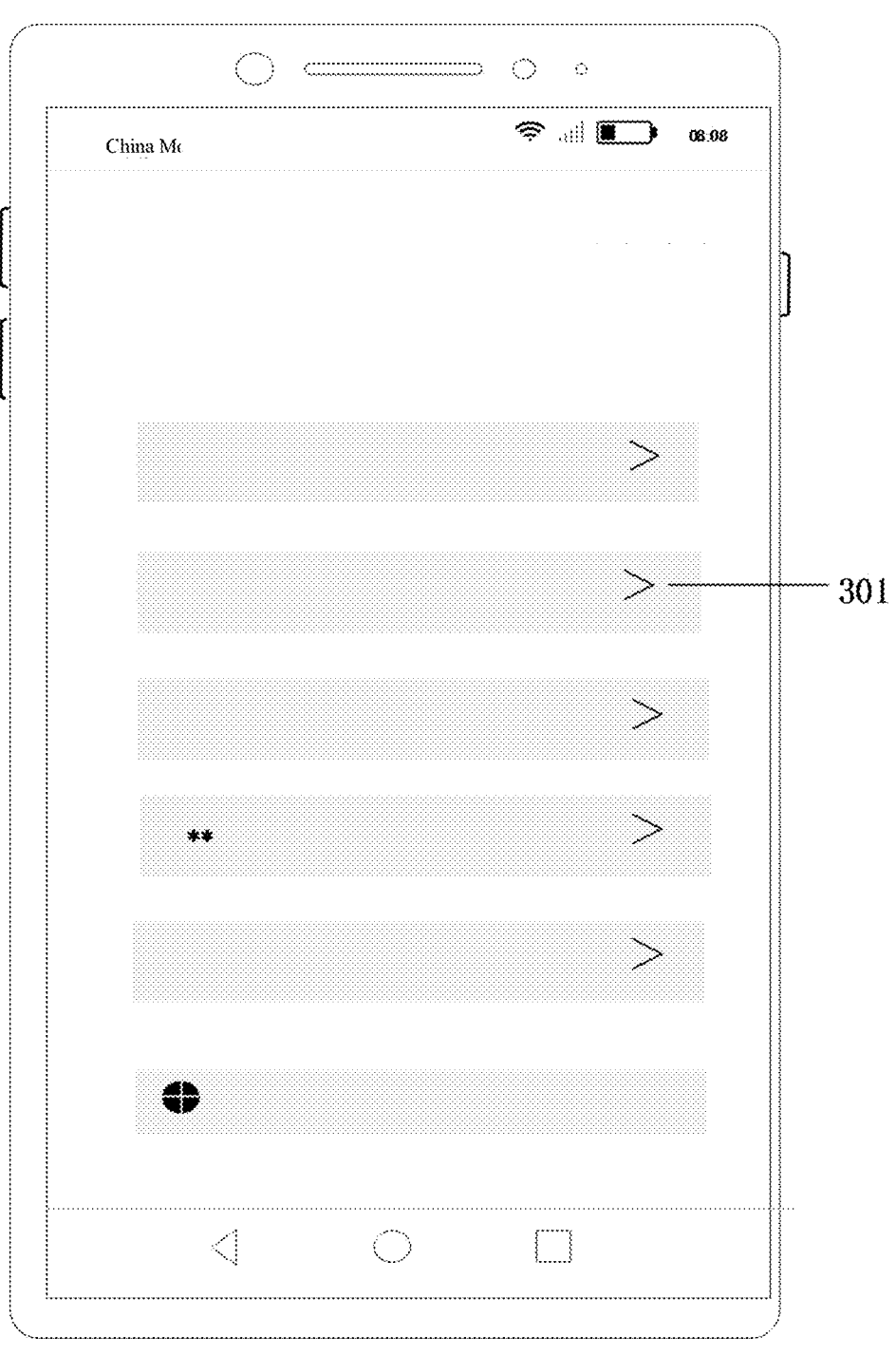
FIG. 3 is a schematic diagram of a recommended content adjustment page of a target application provided in an embodiment of the present disclosure.

FIG. 3 is a schematic diagram of a recommended content adjustment page of a target application provided in an embodiment of the present disclosure. At least one content type tag and the adjustment entry corresponding to each content type tag are displayed on the recommended content adjustment page. As shown in FIG. 3, content type tags such as film and television clips, character snapshots, food, music, etc., as well as the adjustment entries corresponding to the content type tags are displayed on the recommended content adjustment page. For example, a content type tag corresponding to character snapshots and an adjustment entry 301 corresponding to the content type tag are displayed on the recommended content adjustment page.

S102: in response to a trigger operation for an adjustment entry of a target content type tag in the at least one content type tag, display an adjustment panel corresponding to the target content type tag on the recommended content adjustment page.

The adjustment panel is provided with a plurality of recommendation strength levels.

In the embodiment of the present disclosure, the target content type tag may be any content type tag displayed on the recommended content adjustment page. By triggering the target content type tag displayed on the recommended content adjustment page, the user can display the adjustment panel corresponding to the target content type tag on the recommended content adjustment page, where the adjustment panel is provided with a plurality of recommendation strength levels, for example, an "increase recommendation" level, a "default" level and a "reduce recommendation" level. Different recommendation strength levels correspond to different changes in the recommendation amount of the target application for the content type corresponding to the target content type tag. For example, the "increase recommendation" level is used to indicate that the recommendation amount for a certain content type is increased on the basis of the existing recommendation amount; while the "reduce recommendation" level is used to indicate that the recommendation amount for a certain content type is reduced on the basis of the existing recommendation amount.

In the embodiment of the present disclosure, the recommendation strength levels are used to reflect changes in the recommendation amount of the target application for a certain content type, where the changes refer to changes obtained compared with the existing recommendation amount for the content type. The recommendation strength levels set on the adjustment panel may include three levels, where the three levels include the "increase recommendation" level, the "default" level, and the "reduce recommendation" level. The "reduce recommendation" level is used to indicate that the user expects to reduce the recommendation amount of the target application for a certain content type;

the "increase recommendation" level is used to indicate that the user expects to increase the recommendation amount of the target application for a certain content type; and the "default" level indicates that the user expects to maintain the recommendation amount of the target application for a certain content type.

In practical applications, the recommendation strength levels set on the adjustment panel can also include 5 levels, where the 5 levels include a "significantly increase recommendation" level, an "increase recommendation" level, a "default" level, a "reduce recommendation" level and a "not recommended" level. The "not recommended" level is used to indicate that the user expects not to recommend the target application for a certain content type; and the "significantly increase recommendation" level is used to indicate that the user expects to significantly increase the recommendation amount of the target application for a certain content type, where the more the levels, the finer the adjustment granularity for corresponding content recommendation modes.

Figure 4:
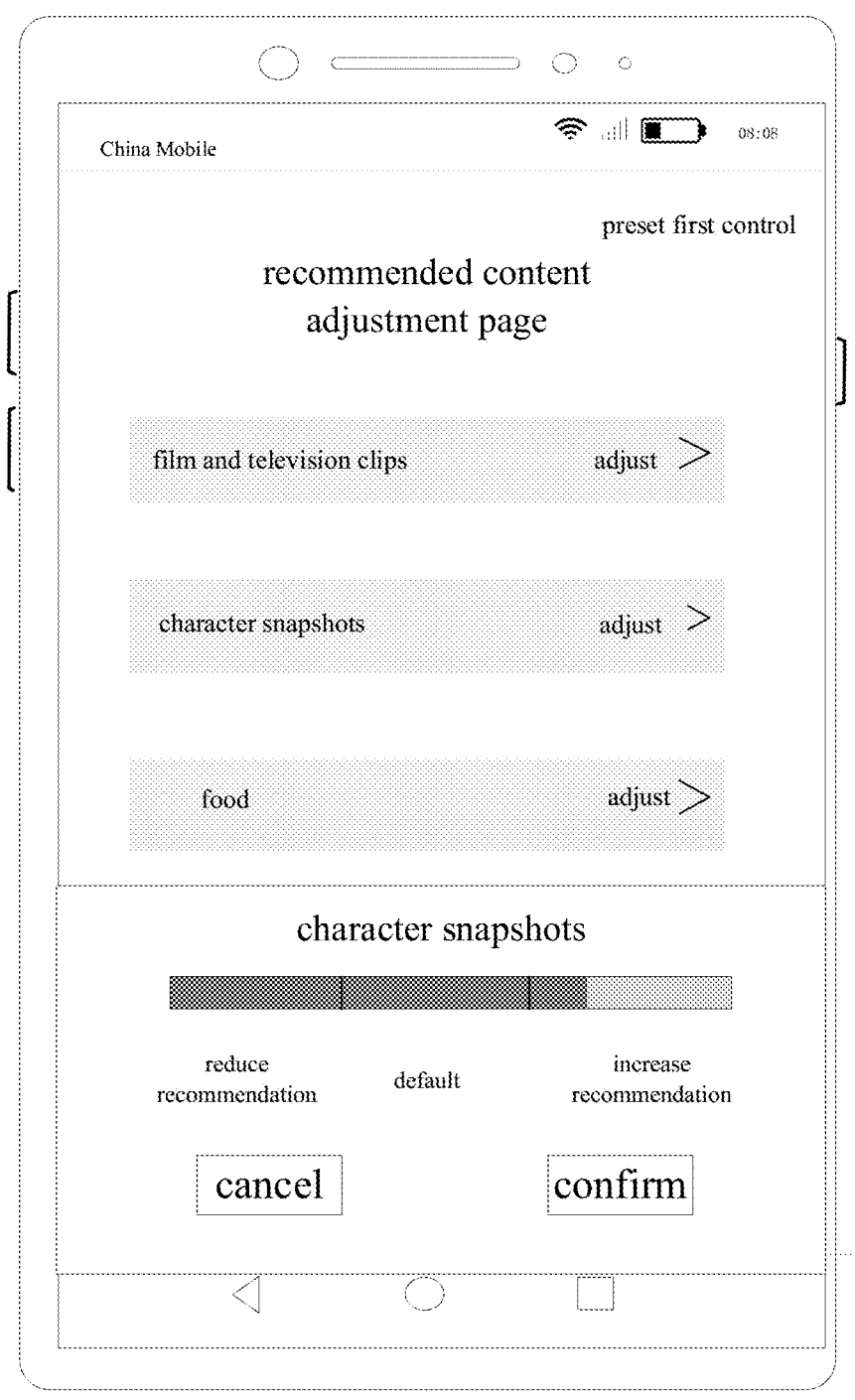
FIG. 4 is a schematic diagram of a recommended content adjustment page of another target application provided in an embodiment of the present disclosure.

FIG. 4 is a schematic diagram of a recommended content adjustment page of another target application provided in an embodiment of the present disclosure. The adjustment panel corresponding to the target content type tag is displayed on the recommended content adjustment page. As shown in FIG. 4, a plurality of recommendation strength levels corresponding to character snapshots, for example, the "increase recommendation" level, the "default" level and the "reduce recommendation" level, are set on the adjustment panel. Based on the adjustment panel shown in FIG. 4, the user can set the recommendation strength level of a character snapshots tag to the "increase recommendation" level.

S103: in response to a selection operation for a target recommendation strength level in the plurality of recommendation strength levels, establish a correspondence between the target content type tag and the target recommendation strength level.

The target recommendation strength level is used to adjust the recommendation amount of the target application for a content type corresponding to the target content type tag.

In the embodiment of the present disclosure, the user can select a target recommendation strength level from among the plurality of recommendation strength levels displayed on the adjustment panel, and click on a "OK" control displayed on the adjustment panel to establish a correspondence between the target content type tag and the target recommendation strength level, so that the function of setting a target recommendation strength level for the content type corresponding to the target content type tag is implemented.

In the embodiment of the present disclosure, the target recommendation strength level is used to adjust the recommendation amount of the target application for the content type corresponding to the target content type tag. For example, the target recommendation strength level can adjust the recommendation amount by adjusting an recommendation frequency of the target application for the content type corresponding to the target content type tag, and can also adjust the recommendation amount by adjusting the total number of recommendations of the target application for the content type corresponding to the target content type tag. For example, the specific modes of adjusting the recommendation amount of the target application for the content type corresponding to the target content type tag are not limited in the embodiment of the present disclosure.

The target recommendation strength level may be any one of the recommendation strength levels set on the adjustment panel described above. For example, the target recommendation strength level may be any one of three levels, or the target recommendation strength level may be anyone of five levels, where the more the levels, the finer the adjustment granularity for corresponding content recommendation modes.

In an optional implementation, after a correspondence between the target recommendation strength level and the target content type tag is established, the adjustment panel corresponding to the target content type tag is closed; and the correspondence between the target content type tag and the target recommendation strength level is displayed on the recommended content adjustment page. For example, after the correspondence between the target content type tag and the target recommendation strength level is established, the recommended content adjustment page is displayed, and the content type tags that have been adjusted and the recommendation strength levels corresponding to the content type tags, as well as the content type tags that have not been adjusted and the default level corresponding to the content type tags are displayed on the recommended content adjustment page.

In practical applications, the user clicks on the "OK" control displayed on the adjustment panel to establish the correspondence between the target content type tag and the target recommendation strength level, automatically close the adjustment panel corresponding to the target content type tag, and directly display the recommended content adjustment page. Or, the user clicks on or slides to close the control of the adjustment panel corresponding to the target content type tag, such that the recommended content adjustment page is displayed.

In the embodiment of the present disclosure, the content type tags that have been adjusted are used to indicate the content type tags that the user has adjusted, that is, the content type tags corresponding to a non-default level. For example, if the user adjusts a certain content type tag to the "increase recommendation" level or "reduce recommendation" level, the recommendation amount for the content type corresponding to the content type tag can be finely adjusted. The content type tags that have not been adjusted are used to indicate the content type tags that the user has not adjusted, and can be the content type tags corresponding to the "default" level. For example, the user has not adjusted a certain content type tag, or has adjusted a certain content type tag to the "default" level.

Figure 5:
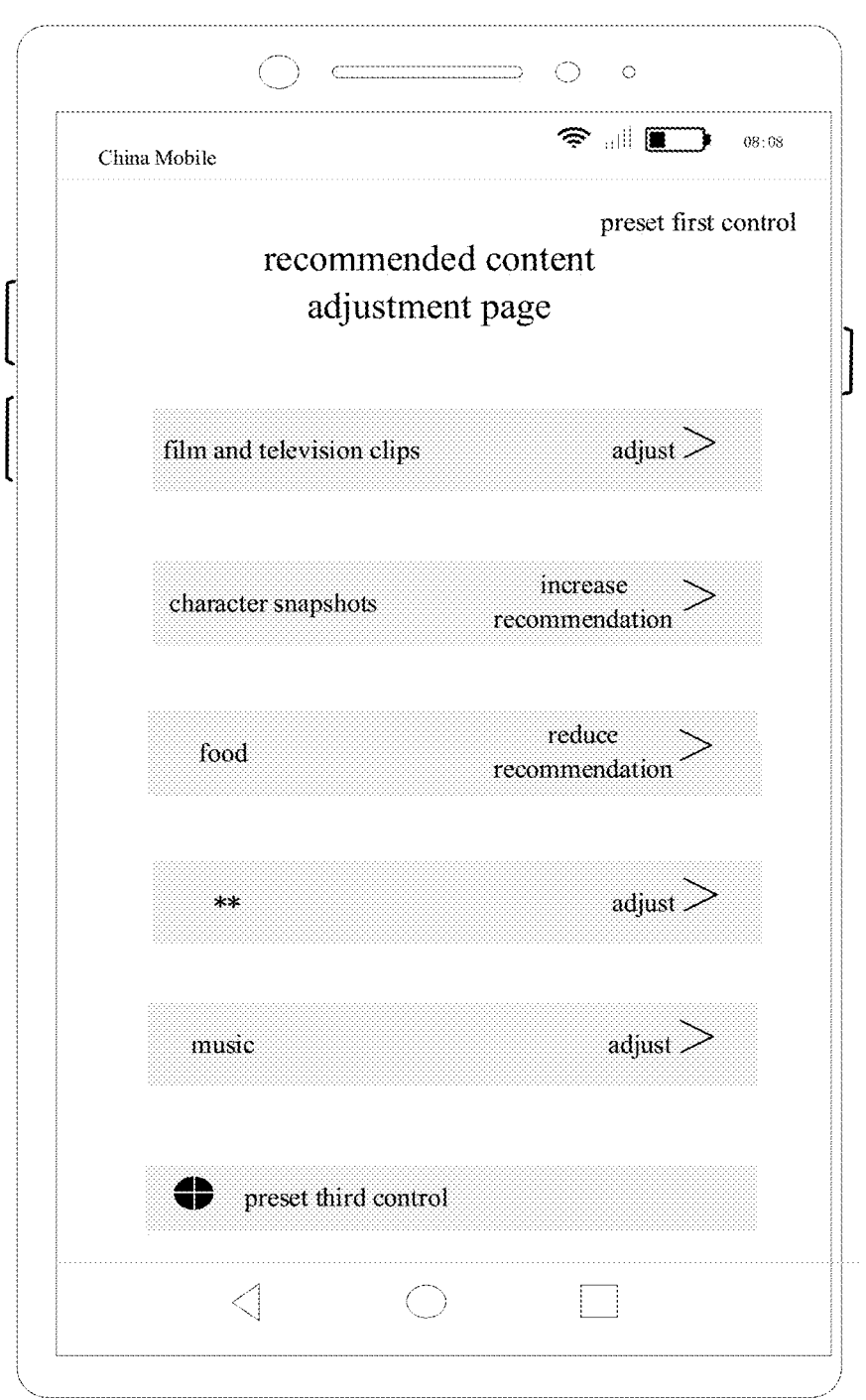
FIG. 5 is a schematic diagram of a recommended content adjustment page of yet another target application provided in an embodiment of the present disclosure.

FIG. 5 is a schematic diagram of a recommended content adjustment page of yet another target application provided in an embodiment of the present disclosure. The character snapshots tag and the "increase recommendation" level corresponding to the character snapshots tag are displayed on the recommended content adjustment page; the food tag and the "reduce recommendation" level corresponding to the food tag are displayed on the recommended content adjustment page; and the music tag, etc. that have not been adjusted and the "default" level corresponding to the music tag, etc. that have not been adjusted are also displayed on the recommended content adjustment page.

Embodiments of the present disclosure provide a data processing method, including: first, displaying a recommended content adjustment page of a target application, and displaying at least one content type tag on the recommended content adjustment page, where the content type tags are provided with adjustment entries, and the content type tags are used to identify content types recommended by the target application; in response to a trigger operation for an adjustment entry of a target content type tag in the at least one content type tag, displaying an adjustment panel corresponding to the target content type tag on the recommended content adjustment page, where the adjustment panel is provided with a plurality of recommendation strength levels; and then, in response to a selection operation for a target recommendation strength level in the plurality of recommendation strength levels, establishing a correspondence between the target content type tag and the target recommendation strength level, where the target recommendation strength level is used to adjust the recommendation amount of the target application for a content type corresponding to the target content type tag. It can be seen, according to the embodiments of the present disclosure, that different recommendation strength levels are set for the content type tags, and the recommendation amount of the target application for content types corresponding to the content type tags is adjusted, so that finer-grained adjustment for content recommendation modes of the target application is realized, and the growing needs of users for content recommendation are met.

On the basis of the above embodiments, an embodiment of the present disclosure further provides another data processing method, which, after displaying the recommended content adjustment page of the target application, further includes: in response to a triggering operation for a preset first control on the recommended content adjustment page, jumping from the recommended content adjustment page to a first adjustment page, and displaying, on the first adjustment page, the content type tags that have been adjusted and the recommendation strength levels corresponding to the content type tags.

In the embodiment of the present disclosure, the preset first control is displayed on the recommended content adjustment page of the target application. The user clicks on the preset first control to trigger a jump from the recommended content adjustment page to the first adjustment page, and display, on the first adjustment page, the content type tags that have been adjusted and the recommendation strength levels corresponding to the content type tags. The content type tags that have been adjusted include content type tags with the recommendation strength levels set, that is, the content type tags corresponding to the non-default level. Content type tags that have been adjusted can be understood with reference to the above, and will not be described again here. The content type tags that have not been adjusted and its corresponding "default" level will not be displayed on the first adjustment page.

Figure 6:
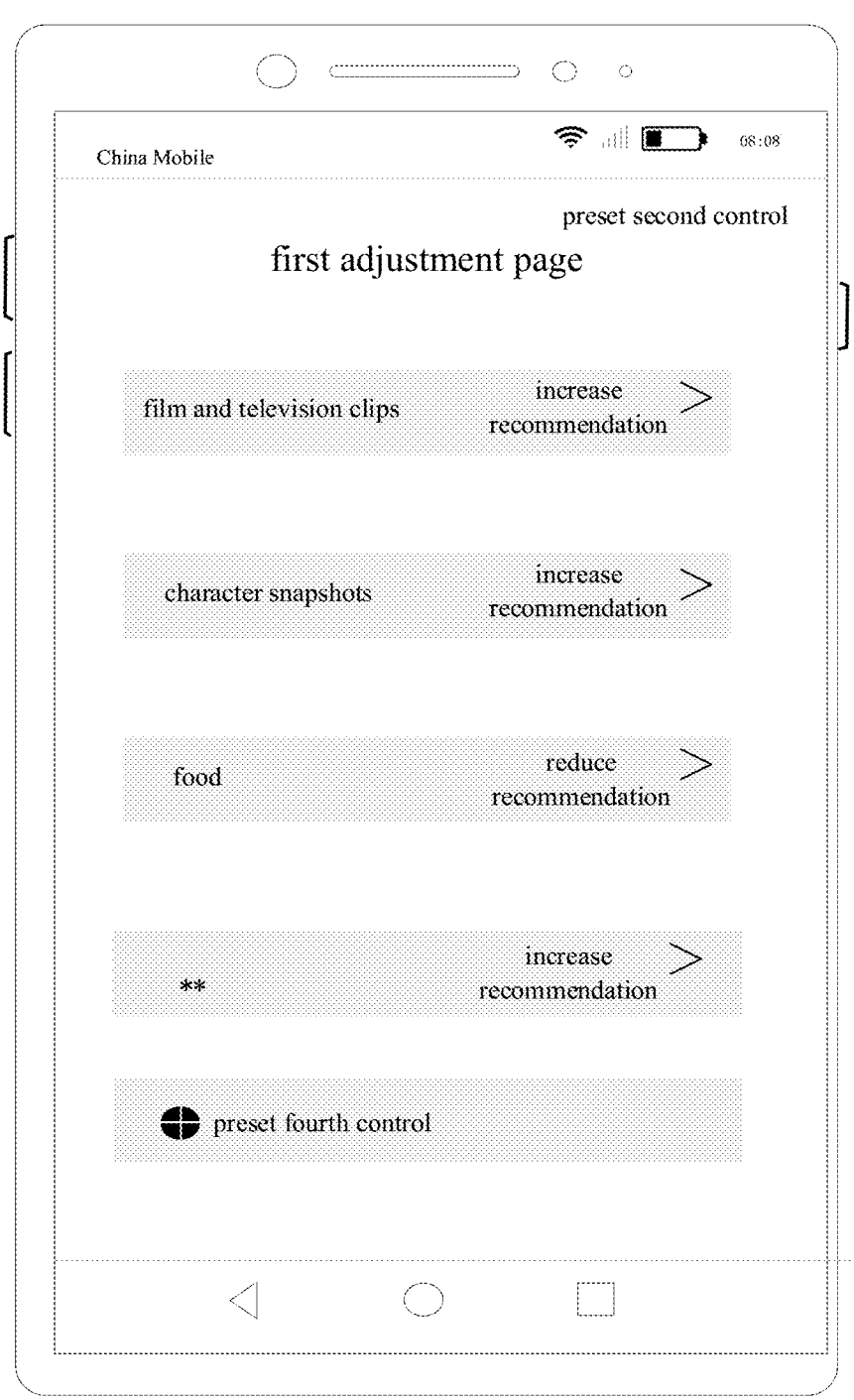
FIG. 6 is a schematic diagram of a first adjustment page provided in an embodiment of the present disclosure.

FIG. 6 is a schematic diagram of a first adjustment page provided in an embodiment of the present disclosure. The "increase recommendation" level corresponding to the film and television clips tag, character snapshots tag, etc. is displayed on the first adjustment page, and the "reduce recommendation" level corresponding to the food tag, etc. is also displayed on the recommended content adjustment page. However, the music tag, etc. that have not been adjusted and the "default" level corresponding to the music tag, etc. that have not been adjusted are not displayed on the recommended content adjustment page.

In some embodiments, the content type tags displayed on the first adjustment page are respectively provided with adjustment entries, and the adjustment entries are used to update the recommendation strength levels of the content type tags corresponding to the adjustment entries.

Figure 7:
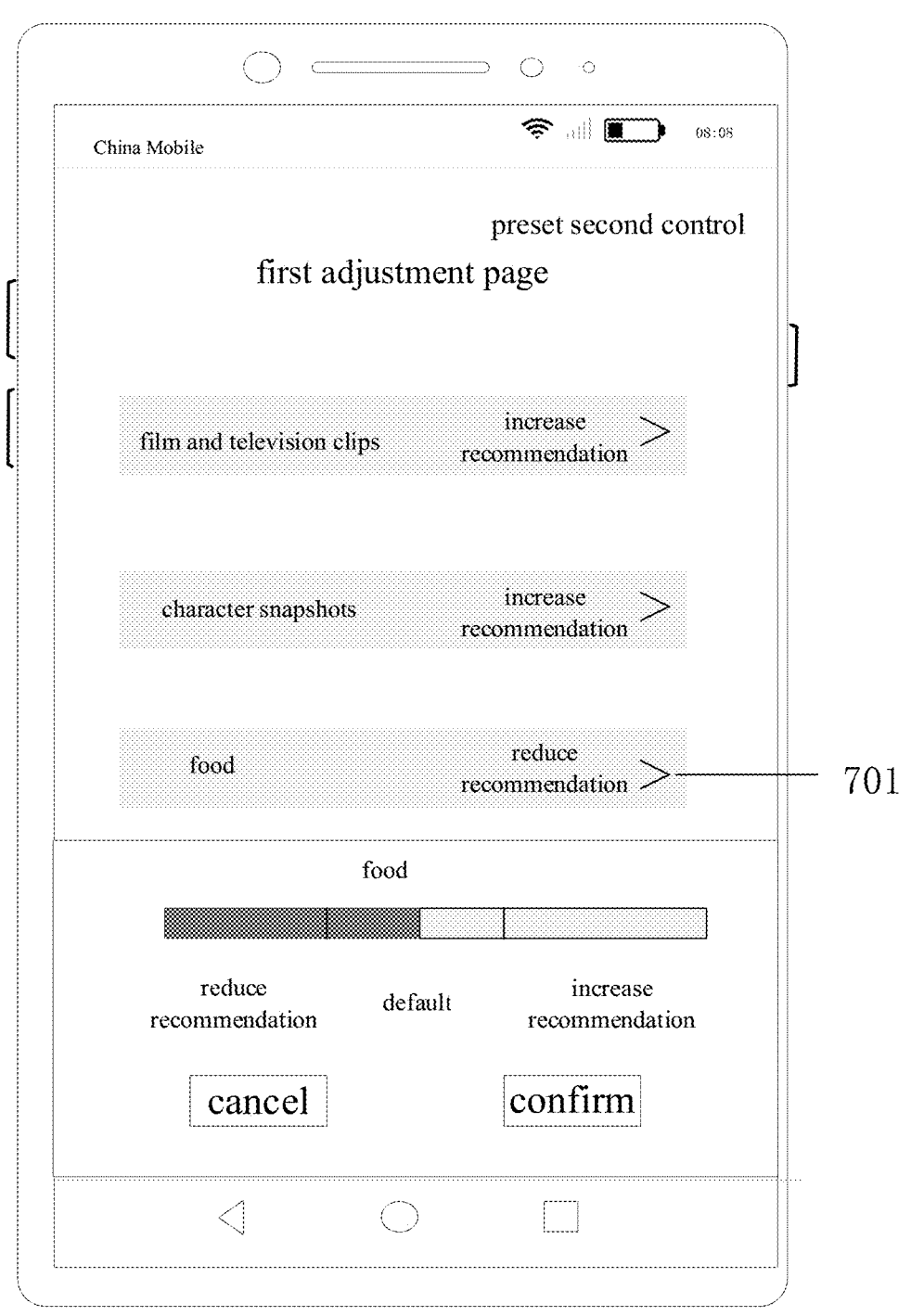
FIG. 7 is a schematic diagram of another first adjustment page provided in an embodiment of the present disclosure.

In practical applications, the content type tags displayed on the first adjustment page respectively correspond to the adjustment entries. When needing to adjust the recommendation strength levels of the content type tags that have been adjusted, the user can click on the adjustment entries respectively corresponding to the content type tags displayed on the first adjustment page, so that the recommendation strength levels of the content type tags corresponding to the adjustment entries can be updated. Referring to FIG. 7, which a schematic diagram of another first adjustment page provided in an embodiment of the present disclosure, the user clicks on the adjustment entries 701 respectively corresponding to the food tags displayed on the first adjustment page to display the adjustment panel on the first adjustment page, where an "increase recommendation" level, a "default" level and a "reduce recommendation" level are set on the adjustment panel. The "increase recommendation" level, the "default" level and the "reduce recommendation" level set on the adjustment panel shown in FIG. 7 can be understood by referring to the "increase recommendation" level, the "default" level and the "reduce recommendation" level set on the adjustment panel shown in FIG. 4, and will not be described again here. The user can update the recommendation strength level of the food tags by clicking on the "increase recommendation" level or the "default" level displayed on the adjustment panel. On the adjustment panel shown in FIG. 7, the user selects to set the recommendation strength level of the food tags to the "default" level.

In some embodiments, the method further includes: receiving a triggering operation for a preset second control on the first adjustment page, and restoring the recommendation strength levels respectively corresponding to the content type tags displayed on the first adjustment page to a default level.

In practical applications, the preset second control is also displayed on the first adjustment page. When needing to restore the recommendation strength levels corresponding to the content type tags that have been adjusted to the default level, the user can click on the preset second control displayed on the first adjustment page. At this time, the recommendation strength levels respectively corresponding to the content type tags displayed on the first adjustment page are restored to the default level.

Figure 8:
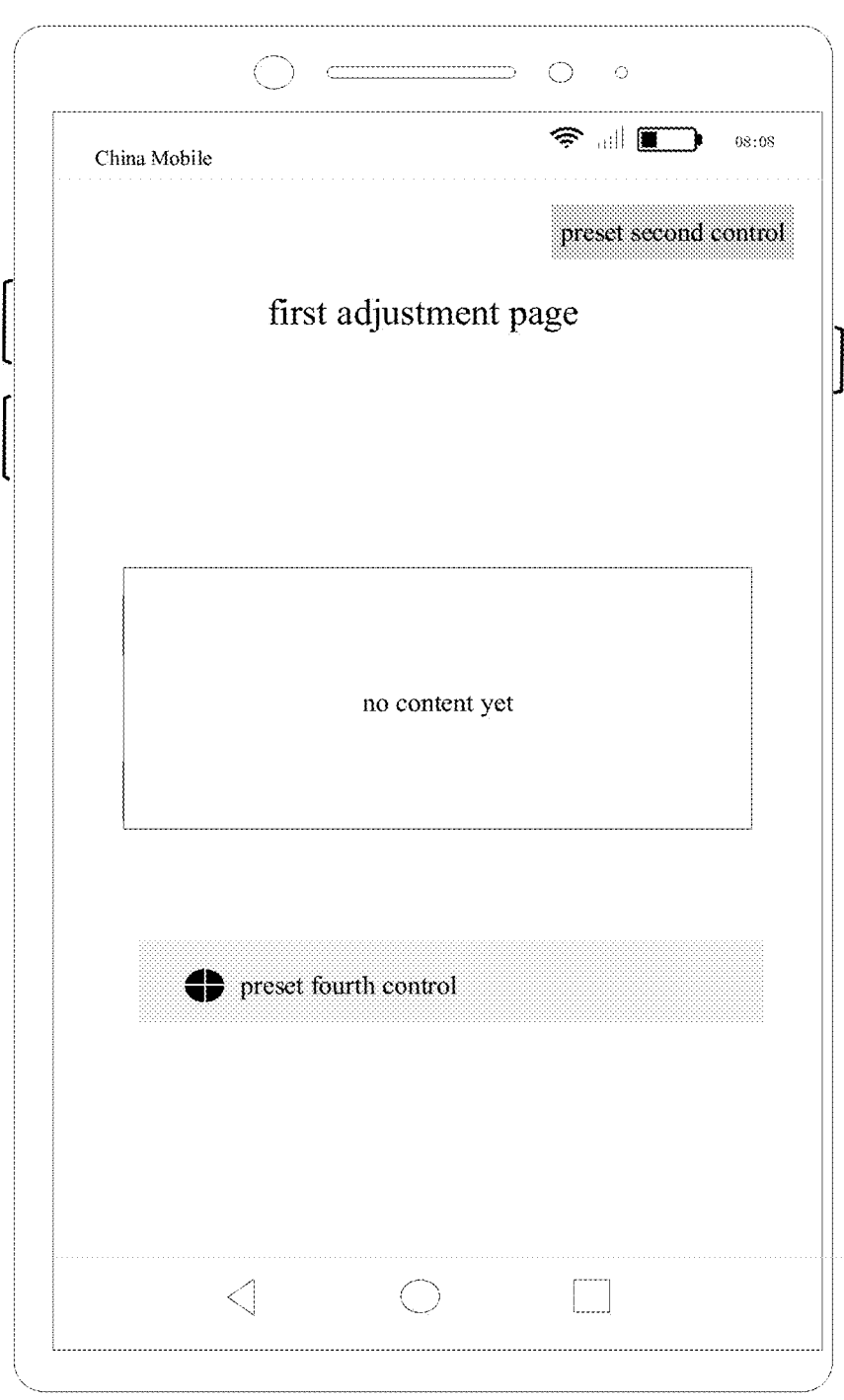
FIG. 8 is a schematic diagram of yet another first adjustment page provided in an embodiment of the present disclosure.

In some embodiments, when the recommendation strength levels respectively corresponding to the content type tags displayed on the first adjustment page are restored to the default level, prompt information of "no content yet" is displayed on the first adjustment page. For example, information displayed on the first adjustment page may be as shown in FIG. 8, and FIG. 8 is a schematic diagram of yet another first adjustment page provided in an embodiment of the present disclosure. The prompt information of "no content yet" is displayed on the first adjustment page, and the preset second control being grayed out is displayed on the first adjustment page for prompting the user that the recommendation strength levels respectively corresponding to the content type tags displayed on the first adjustment page have been restored to the default level.

In some embodiments, when the recommendation strength levels respectively corresponding to the content type tags displayed on the first adjustment page are restored to the default level, a jump from the first adjustment page to the recommended content adjustment page can be realized, and for example, content displayed on the recommended content adjustment page can be as shown in FIG. 3 above. Content type tags such as film and television clips, character snapshots, food, music, etc., as well as the adjustment entries corresponding to the content type tags are displayed on the recommended content adjustment page. The user can adjust again the recommendation strength levels of the content type tags shown in FIG. 3.

In practical applications, a preset third control is further displayed on the recommended content adjustment page, and a preset fourth control is further displayed on the first adjustment page. In some embodiments, in response to a triggering operation for the preset third control on the recommended content adjustment page, a tag selection page is displayed, where a preset number of content type tags are displayed on the tag selection page; and at least one content type tag selected on the tag selection page is received, and the at least one content type tag is added to the first adjustment page. In other embodiments, in response to a triggering operation for the preset fourth control on the first adjustment page, the tag selection page is displayed, where a preset number of content type tags are displayed on the tag selection page; and at least one content type tag selected on the tag selection page is received, and the at least one content type tag is added to the first adjustment page.

Assuming that the user clicks on the preset third control displayed on the recommended content adjustment page, the recommended content adjustment page can jump to the tag selection page. A preset number of content type tags are displayed on the tag selection page, where the preset number of content type tags can be determined based on the user using the target application, which is not limited here. In some embodiments, before the preset number of content type tags are displayed on the tag selection page, the content type tags displayed on the tag selection page need to be de-duplicated from the content type tags displayed on the recommended content adjustment page, so that the content type tags displayed on the tag selection page are different from the content type tags displayed on the recommended content adjustment page. By selecting at least one content type tag on the tag selection page, the user can add the at least one content type tag selected to the first adjustment page.

Figure 9:
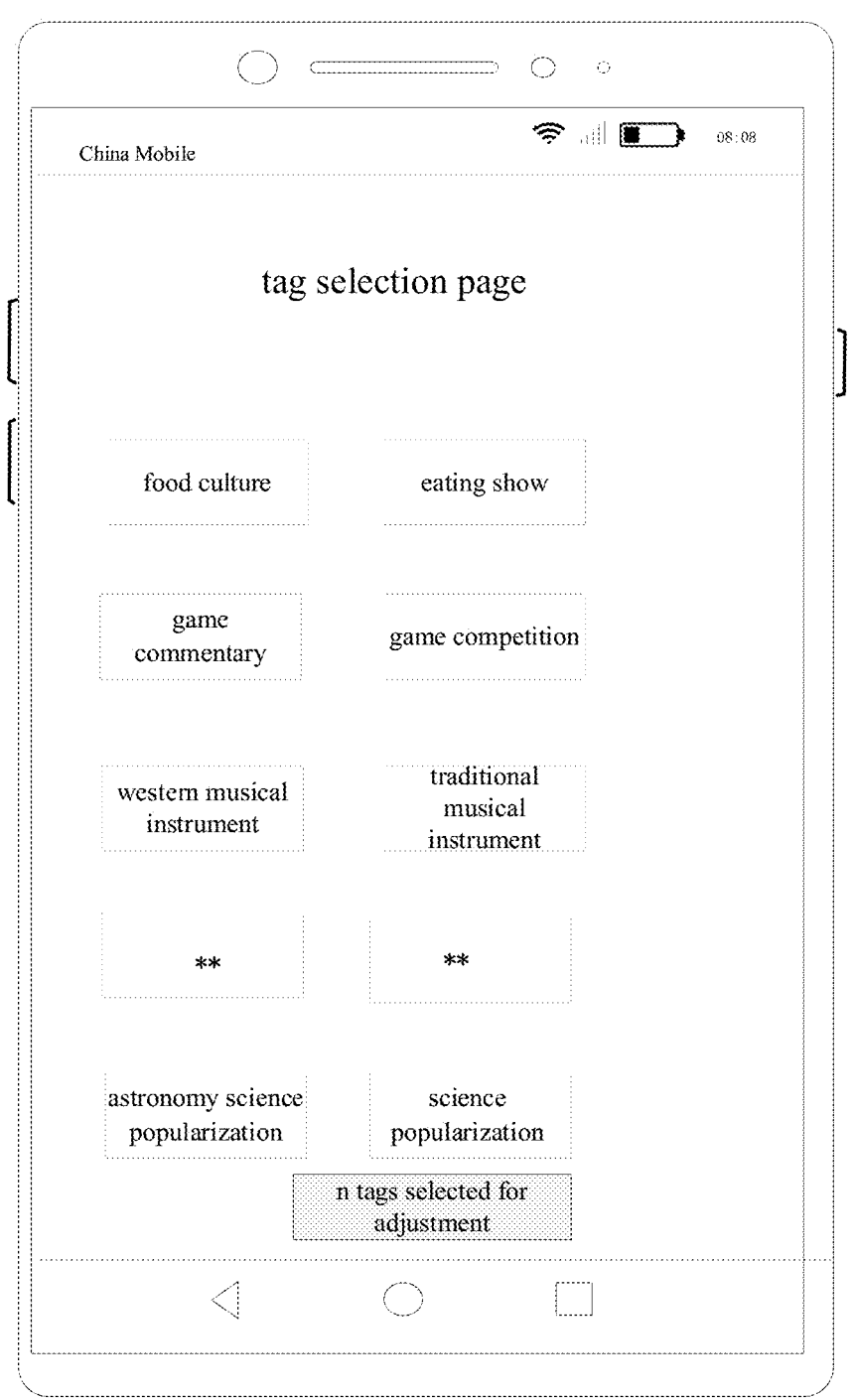
FIG. 9 is a schematic diagram of a tag selection page provided in an embodiment of the present disclosure.
Figure 10:
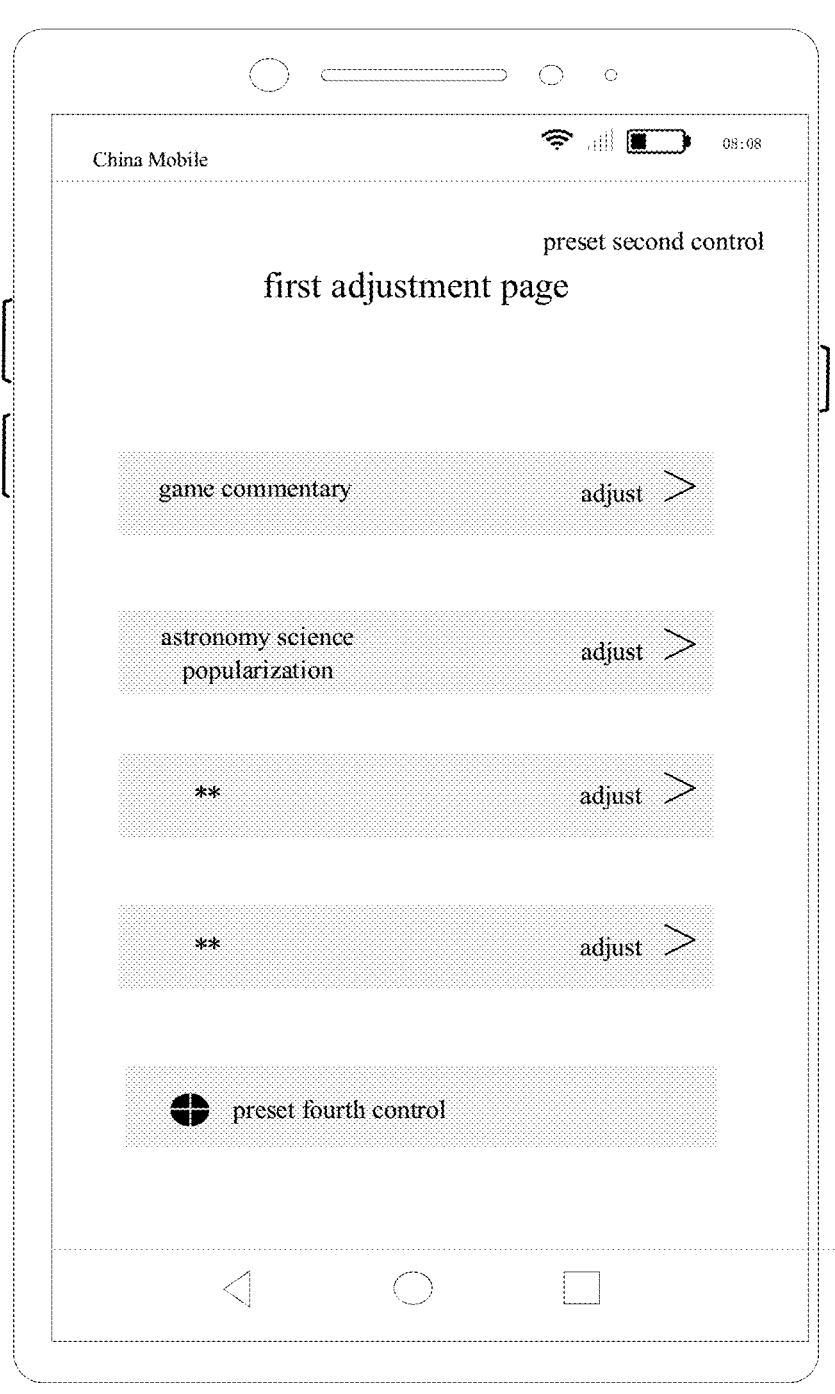
FIG. 10 is a schematic diagram of yet another first adjustment page provided in an embodiment of the present disclosure.

FIG. 9 is a schematic diagram of a tag selection page provided in an embodiment of the present disclosure. Assuming that the user clicks on the preset third control displayed on the recommended content adjustment page shown in FIG. 3, a jump from the recommended content adjustment page shown in FIG. 3 to the tag selection page shown in FIG. 9 can be realized. By clicking on a game commentary tag shown in FIG. 9, the user can add the game commentary tag to a control corresponding to the selected adjustment, where the number of content type tags that the user has selected to add is also displayed in the control corresponding to the selected adjustment. The user clicks on the control corresponding to the selected adjustment, and a jump from the tag selection page shown in FIG. 9 to the first adjustment page can be realized. FIG. 10 is a schematic diagram of yet another first adjustment page provided in an embodiment of the present disclosure. The content type tags that the user has selected to add and the adjustment entries corresponding to the content type tags that have been selected to add are displayed on the first adjustment page shown in FIG. 10. As shown in FIG. 10, user-selected "game commentary" content type tags and corresponding adjustment entries, "astronomy science popularization" content type tags and corresponding adjustment entries, etc. are displayed on the first adjustment page shown in FIG. 10.

Assuming that the user clicks on the preset fourth control on the first adjustment page, a jump from the first adjustment page to the tag selection page can be realized. A preset number of content type tags are displayed on the tag selection page, and by selecting at least one content type tag on the tag selection page, the user can add the at least one content type tag selected to the first adjustment page.

Assuming that the user clicks on the preset fourth control on the first adjustment page shown in FIG. 8, a jump from the first adjustment page shown in FIG. 8 to the tag selection page shown in FIG. 9 can be realized. By clicking on the game commentary tag shown in FIG. 9, the user can add the game commentary tag to a control corresponding to the selected adjustment. The number of content type tags that the user has selected to add is also displayed in the control corresponding to the selected adjustment. The user clicking on the control corresponding to the selected adjustment can realize the jump from the tag selection page shown in FIG. 9 to the first adjustment page. For example, content type tags that the user has selected to add and displayed on the first adjustment page shown in FIG. 10 and its corresponding adjustment entries can refer to the above description, which will not be described again here.

In practical applications, before displaying at least one content type tag on the recommended content adjustment page, the method further includes: determining at least one content type tag based on the current user's historical browsing records in the target application, where the historical browsing records include browsing content within a most recent preset time period.

Figure 11:
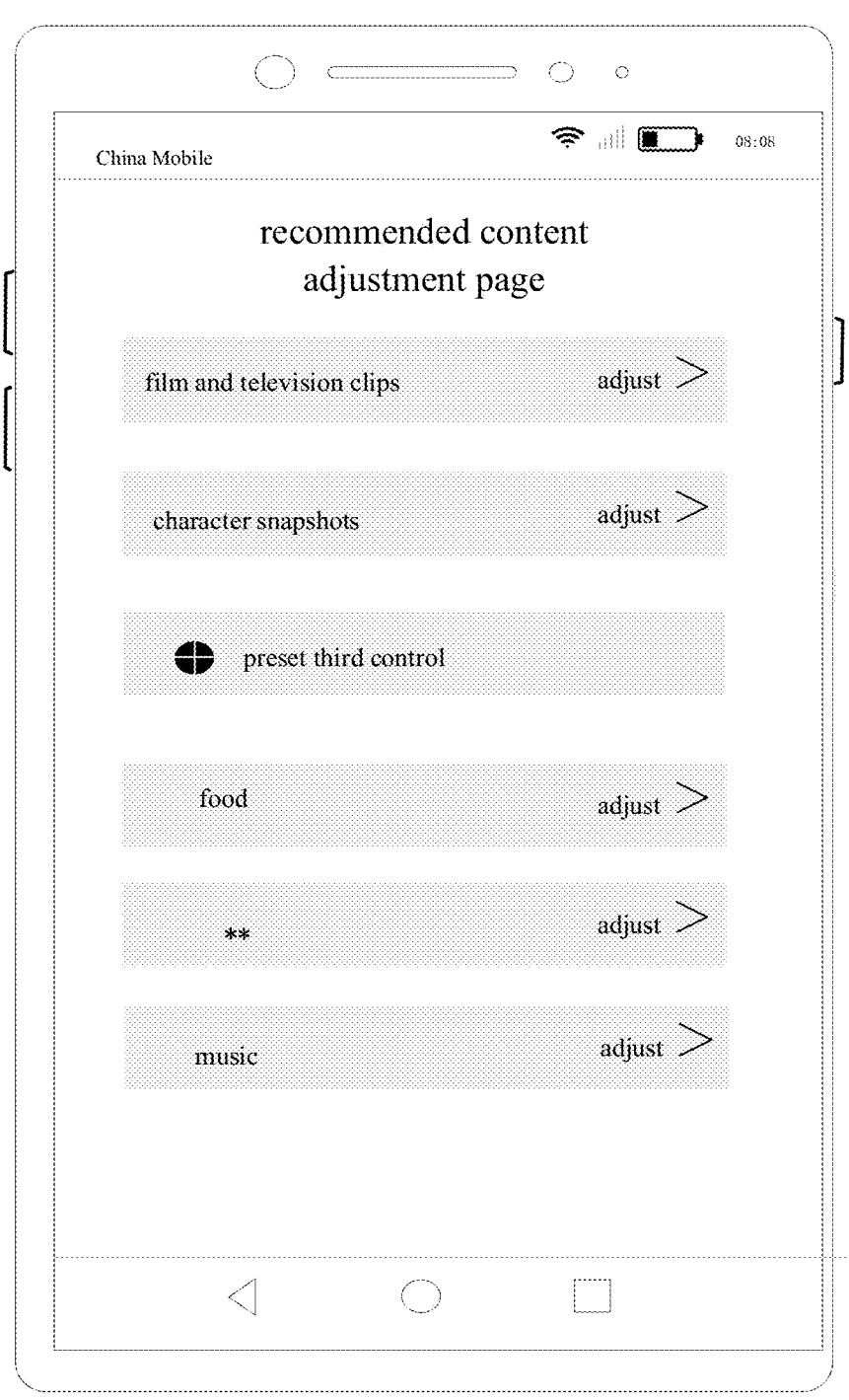
FIG. 11 is a schematic diagram of a recommended content adjustment page of yet another target application provided in an embodiment of the present disclosure.

For example, in some embodiments, on the premise that the user authorizes the use of historical browsing records, the content types with a higher browsing frequency can be determined as content type tags based on the user's browsing content in the most recent preset time period. In other embodiments, assuming that the number of content type tags displayed on the recommended content adjustment page is not greater than a preset value, the user triggers the preset third control on the recommended content adjustment page, where the preset value can be determined based on the actual situation. For example, the preset value can be determined as a positive integer not greater than 2. At least one recommended content type tag is displayed on the recommended content adjustment page. For example, at least one content type tag displayed on the recommended content adjustment page may be as shown in FIG. 11. FIG. 11 is a schematic diagram of yet another recommended content adjustment page provided in an embodiment of the present disclosure. The user-selected "film and television clips" content type tags and "character snapshots" content type tags are displayed on the recommended content adjustment page shown in FIG. 11. After the user triggers the preset third control on the recommended content adjustment page, the "food" content type tags, the "music" content type tags, etc. with a higher browsing frequency are recommended to user by default.

Figure 12:
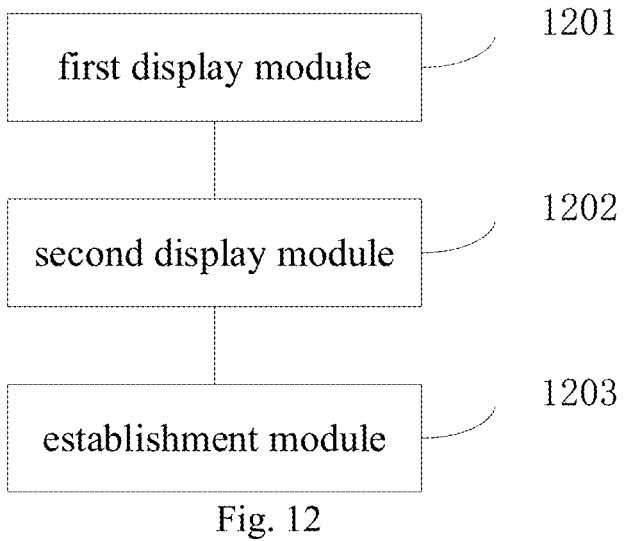
FIG. 12 is a schematic structural diagram of a data processing apparatus provided in an embodiment of the present disclosure.

It can be seen that the embodiments of the present disclosure allow users to select a plurality of content type tags that they are interested in, and set different recommendation strength levels for the selected content type tags, thereby adjusting the recommendation amount of the target application for the content types corresponding to the content type tags, realizing finer-grained adjustment for content recommendation modes of the target application, and meeting the growing needs of users for content recommendation Based on the above method embodiments, the present disclosure further provides a data processing apparatus. Referring to FIG. 12, which is a schematic structural diagram of a data processing apparatus provided in an embodiment of the present disclosure, the apparatus includes:

a first display module 1201, which is used for displaying a recommended content adjustment page of a target application, and displaying at least one content type tag on the recommended content adjustment page, where the at least one content type tag is respectively provided with an adjustment entry, and the content type tags are used to identify content types recommended by the target application;

a second display module 1202, which is used for displaying, in response to a trigger operation for an adjustment entry of a target content type tag in the at least one content type tag, an adjustment panel corresponding to the target content type tag on the recommended content adjustment page, where the adjustment panel is provided with a plurality of recommendation strength levels; and an establishment module 1203, which is used for establishing, in response to a selection operation for a target recommendation strength level in the plurality of recommendation strength levels, a correspondence between the target content type tag and the target recommendation strength level, where the target recommendation strength level is used to adjust the recommendation amount of the target application for a content type corresponding to the target content type tag.

In some embodiments, the apparatus further includes:

a closing module, which is used for closing the adjustment panel corresponding to the target content type tag; and a third display module, which is used for displaying the correspondence between the target content type tag and the target recommendation strength level on the recommended content adjustment page.

In some embodiments, the apparatus further includes:

a first jump module, which is used for jumping, in response to a triggering operation for a preset first control on the recommended content adjustment page, from the recommended content adjustment page to a first adjustment page, and displaying, on the first adjustment page, the content type tags that have been adjusted and the recommendation strength levels corresponding to the content type tags.

In some embodiments, the content type tags displayed on the first adjustment page are respectively provided with adjustment entries, and the adjustment entries are used to update the recommendation strength levels of the content type tags corresponding to the adjustment entries.

In some embodiments, the apparatus further includes:

a restoration module, which is used for receiving a triggering operation for a preset second control on the first adjustment page, and restoring the recommendation strength levels respectively corresponding to the content type tags displayed on the first adjustment page to a default level.

In an optional implementation, the apparatus further includes:

a display module, which is used for displaying a tag selection page in response to a triggering operation for a preset third control on the recommended content adjustment page or a preset fourth control on the first adjustment page, where a preset number of content type tags are displayed on the tag selection page; and an addition module, which is used for receiving at least one content type tag selected on the tag selection page, and adding the at least one content type tag to the first adjustment page.

In some embodiments, the apparatus further includes:

a second display module, which is used for displaying an application management page of the target application, where the application management page is provided with a recommended content adjustment entry;

accordingly, the first display module 1201 is specifically used for:

displaying, in response to a triggering operation for the recommended content adjustment entry, the recommended content adjustment page of the target application.

In some embodiments, the apparatus further includes:

a determination module, which is used for determining at least one content type tag based on the current user's historical browsing records in the target application, where the historical browsing records include browsing content within a most recent preset time period.

Embodiments of the present disclosure provide a data processing apparatus, including: first, displaying a recommended content adjustment page of a target application, and displaying at least one content type tag on the recommended content adjustment page, where the content type tags are provided with adjustment entries, and the content type tags are used to identify content types recommended by the target application; in response to a trigger operation for an adjustment entry of a target content type tag in the at least one content type tag, displaying an adjustment panel corresponding to the target content type tag on the recommended content adjustment page, where the adjustment panel is provided with a plurality of recommendation strength levels; and then, in response to a selection operation for a target recommendation strength level in the plurality of recommendation strength levels, establishing a correspondence between the target content type tag and the target recommendation strength level, where the target recommendation strength level is used to adjust the recommendation amount of the target application for a content type corresponding to the target content type tag. It can be seen, according to the embodiments of the present disclosure, that different recommendation strength levels are set for the content type tags, and the recommendation amount of the target application for content types corresponding to the content type tags is adjusted, so that finer-grained adjustment for content recommendation modes of the target application is realized, and the growing needs of users for content recommendation are met.

The above modules can be implemented as software components that execute on one or more general-purpose processors, or as hardware that performs certain functions or combinations thereof, such as programmable logic devices and/or specialized integrated circuits. In some embodiments, these modules can be embodied in the form of software products that can be stored on non-volatile storage media, including enabling computer devices (such as personal computers, servers, network devices, mobile terminals, etc.) to implement the methods described in the embodiments of the present disclosure. In other embodiments, the above modules can also be implemented on a single device or distributed across multiple devices. The functions of these modules can be merged with each other or further divided into multiple sub modules.

In addition to the above method and apparatus, an embodiment of the present disclosure further provides a computer-readable storage medium storing instructions which, when run on a terminal device, cause the terminal device to implement the data processing method described in the embodiment of the present disclosure.

An embodiment of the present disclosure further provides a computer program product including a computer program/instruction which, when executed by a processor, the data processing method described in the embodiment of the present disclosure being implemented.

Figure 13:
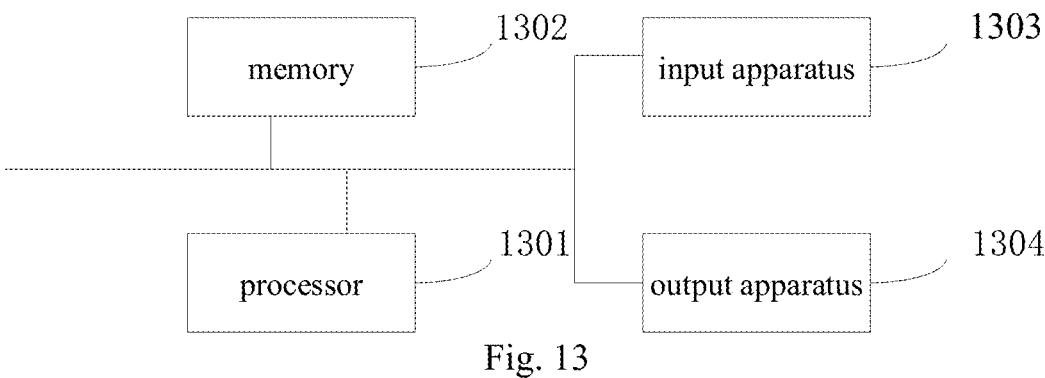
FIG. 13 is a schematic structural diagram of a data processing device provided in an embodiment of the present disclosure.

In addition, an embodiment of the present disclosure further provides a data processing device, as shown in FIG. 13, which may include:

a processor 1301, a memory 1302, an input apparatus 1303, and an output apparatus 1304. There may be one or more processors 1301 in the data processing device, and one processor is taken as an example in FIG. 13. In some embodiments of the present disclosure, the processor 1301, the memory 1302, the input apparatus 1303 and the output apparatus 1304 may be connected through a bus or by other means, where the connection through the bus is taken as an example in FIG. 13.

The memory 1302 can be used to store software programs and modules. The processor 1301 executes various functional applications and data processing of the data processing device by running the software programs and modules stored in the memory 1302. The memory 1302 may mainly include a program storage area and a data storage area, where the program storage area may store an operating system, at least one application required for a function, etc. In addition, the memory 1302 may include a high-speed random access memory, and may also include a non-volatile memory, such as at least one magnetic disk storage device, flash memory device, or other volatile solid-state storage device. The input apparatus 1303 may be used for receiving input numeric or character information, and generating signal inputs related to user settings and functional controls of the data processing device.

Specifically, in this embodiment, the processor 1301 will load executable files corresponding to the processes of one or more applications into the memory 1302 according to the following instructions, and the processor 1301 will run the applications stored in the memory 1302, thereby implementing various functions of the above data processing device.

According to some embodiments of the present disclosure, a computer program is provided, comprising instructions that, when executed by a processor, cause the processor to execute the data processing method according to any embodiment of the present disclosure.

It should be noted that in this article, relational terms such as "first" and "second" are only used to distinguish one entity or operation from another entity or operation, and do not necessarily require or imply that there is any such actual relationship or sequence between these entities or operations. Furthermore, terms "includes", "contains" or any other variations thereof are intended to cover a non-exclusive inclusion such that a process, method, article, or device that includes a list of elements includes not only those elements, but also other elements that are not expressly listed, or elements inherent to the process, method, article or device. Without further limitation, an element defined by the statement "includes a . . . " does not exclude the presence of additional identical elements in a process, method, article, or device that includes the stated element.

The above descriptions are only specific implementations of the present disclosure, enabling those skilled in the art to understand or implement the present disclosure. Various modifications to these embodiments will be readily apparent to those skilled in the art, and the generic principles defined herein may be practiced in other embodiments without departing from the spirit or scope of the present disclosure. Therefore, the present disclosure is not to be limited to the embodiments described herein but is to be accorded the widest scope consistent with the principles and novel features disclosed herein.

What is claimed is:

1. A method of adjusting recommendation amount for at least one content type among content to be recommended by a target application, comprising:

displaying, on a graphical user interface (GUI) of the target application, a recommended content adjustment page of the target application, wherein at least one content type tag is presented on the recommended content adjustment page, the content type tag is provided with an adjustment entry user interface (UI) control on the recommended content adjustment page, and the content type tag is used to identify content types to be recommended by the target application;

in response to receiving, via the GUI, a trigger operation for an adjustment entry UI control of a target content type tag in the at least one content type tag, displaying an adjustment panel corresponding to the target content type tag on the recommended content adjustment page, wherein the adjustment panel is provided with a plurality of recommendation level UI controls respectively corresponding to a plurality of recommendation strength levels;

in response to receiving, via the GUI, a selection operation for a recommendation level UI control corresponding to a target recommendation strength level in the plurality of recommendation strength levels, establishing a correspondence between the target content type tag and the target recommendation strength level, based on the target recommendation strength level, automatically adjusting the recommendation amount for a content type corresponding to the target content type tag among content to be recommended by the target application, and pushing a corresponding amount of recommended content to a user based on the adjusted recommendation amount;

in response to receiving, via the GUI, a triggering operation for a preset first tag addition UI control on the recommended content adjustment page, displaying a tag selection page, wherein a preset number of content type tags are displayed on the tag selection page; and receiving via the GUI at least one content type tag selected on the tag selection page, and adding the at least one content type tag and the corresponding adjustment entry UI control to the first adjustment page;

the method further comprises:

after displaying the recommended content adjustment page of the target application, in response to receiving via the GUI a triggering operation for a preset first UI control on the recommended content adjustment page, jumping from the recommended content adjustment page to a first adjustment page, and displaying, on the first adjustment page, the content type tag that has been adjusted and the recommendation strength level corresponding to the content type tag;

in response to receiving via the GUI a triggering operation for a preset second UI control on the first adjustment page, restoring the recommendation strength level corresponding to each content type tag displayed on the first adjustment page to a default level; and in response to that the recommendation strength level corresponding to each content type tag displayed on the first adjustment page is restored to the default level, performing at least one of the followings:

displaying prompt information on the first adjustment page, wherein the prompt information represents that there is no content yet; or making the preset second UI control grayed out.

2. The data processing method according to claim 1, further comprising:

after establishing, in response to receiving via the GUI a selection operation for a recommendation level UI control corresponding to a target recommendation strength level in the plurality of recommendation strength levels, a correspondence between the target recommendation strength level and the target content type tag, closing the adjustment panel corresponding to the target content type tag; and displaying the correspondence between the target content type tag and the target recommendation strength level on the recommended content adjustment page.

3. The data processing method according to claim 1, wherein the content type tag displayed on the first adjustment page is each provided with an adjustment entry UI control, and the adjustment entry UI controls are-control is used to update the recommendation strength level of the content type tag corresponding to the adjustment entry UI control.

4. The data processing method according to claim 1, further comprising:

in response to receiving, via the GUI, a triggering operation for a preset second tag addition UI control on the first adjustment page, displaying a tag selection page, wherein a preset number of content type tags are displayed on the tag selection page; and receiving via the GUI at least one content type tag selected on the tag selection page, and adding the at least one content type tag and the corresponding adjustment entry UI control to the first adjustment page.

5. The data processing method according to claim 4, wherein the content type tag displayed on the tag selection page is different from the content type tag that has been displayed on the recommended content adjustment page.

6. The data processing method according to claim 1, further comprising:

before displaying the recommended content adjustment page of the target application, displaying an application management page of the target application, wherein the application management page is provided with a recommended content adjustment entry UI control;

accordingly, displaying the recommended content adjustment page of the target application comprises:

in response to receiving, via the GUI, a triggering operation for the recommended content adjustment entry UI control, displaying the recommended content adjustment page of the target application.

7. The data processing method according to claim 1, further comprising:

before displaying at least one content type tag on the recommended content adjustment page, determining at least one content type tag based on the current user's historical browsing records in the target application, wherein the historical browsing records comprise browsing content within a most recent preset time period.

8. A non-transitory computer-readable storage medium storing instructions which, when run on a terminal device, cause the terminal device to implement a data processing method of adjusting recommendation amount for at least one content type among content to be recommended by a target application, comprising:

displaying, on a graphical user interface (GUI) of the target application, a recommended content adjustment page of the target application, wherein at least one content type tag is presented on the recommended content adjustment page, the content type tag is provided with an adjustment entry user interface (UI) control on the recommended content adjustment page, and the content type tag is used to identify content types to be recommended by the target application;

in response to receiving, via the GUI, a trigger operation for an adjustment entry UI control of a target content type tag in the at least one content type tag, displaying an adjustment panel corresponding to the target content type tag on the recommended content adjustment page, wherein the adjustment panel is provided with a plurality of recommendation level UI controls respectively corresponding to a plurality of recommendation strength levels;

in response to receiving, via the GUI, a selection operation for a recommendation level UI control corresponding to a target recommendation strength level in the plurality of recommendation strength levels, establishing a correspondence between the target content type tag and the target recommendation strength level, based on the target recommendation strength level, automatically adjusting the recommendation amount for a content type corresponding to the target content type tag among content to be recommended by the target application, and pushing a corresponding amount of recommended content to a user based on the adjusted recommendation amount;

in response to receiving, via the GUI, a triggering operation for a preset first tag addition UI control on the recommended content adjustment page, displaying a tag selection page, wherein a preset number of content type tags are displayed on the tag selection page; and receiving via the GUI at least one content type tag selected on the tag selection page, and adding the at least one content type tag and the corresponding adjustment entry UI control to the first adjustment page;

the method further comprises:

after displaying the recommended content adjustment page of the target application, in response to receiving via the GUI a triggering operation for a preset first UI control on the recommended content adjustment page, jumping from the recommended content adjustment page to a first adjustment page, and displaying, on the first adjustment page, the content type tag that has been adjusted and the recommendation strength level corresponding to the content type tag;

in response to receiving via the GUI a triggering operation for a preset second UI control on the first adjustment page, restoring the recommendation strength level corresponding to each content type tag displayed on the first adjustment page to a default level; and in response to that the recommendation strength level corresponding to each content type tag displayed on the first adjustment page is restored to the default level, performing at least one of the followings:

displaying prompt information on the first adjustment page, wherein the prompt information represents that there is no content yet; or making the preset second UI control grayed out.

9. The non-transitory computer-readable storage medium according to claim 8, wherein the instructions when run on the terminal device, cause the terminal device to further implement the following operations:

after establishing, in response to receiving via the GUI a selection operation for a recommendation level UI control corresponding to a target recommendation strength level in the plurality of recommendation strength levels, a correspondence between the target recommendation strength level and the target content type tag, closing the adjustment panel corresponding to the target content type tag; and displaying the correspondence between the target content type tag and the target recommendation strength level on the recommended content adjustment page.

10. The non-transitory computer-readable storage medium according to claim 8, wherein the content type tag displayed on the first adjustment page is each provided with an adjustment entry UI control, and the adjustment entry UI control is used to update the recommendation strength level of the content type tag corresponding to the adjustment entry UI control.

11. A data processing device comprising a memory, a processor, and a computer program instruction that is stored in the memory and executable on the processor, wherein when the processor executes the instruction, implements a method of adjusting recommendation amount for at least one content type among content to be recommended by a target application, comprising:

displaying, on a graphical user interface (GUI) of the target application, a recommended content adjustment page of the target application, wherein at least one content type tag is presented on the recommended content adjustment page, the content type tag is provided with an adjustment entry user interface (UI) control on the recommended content adjustment page, and the content type tag is used to identify content types to be recommended by the target application;

in response to receiving, via the GUI, a trigger operation for an adjustment entry UI control of a target content type tag in the at least one content type tag, displaying an adjustment panel corresponding to the target content type tag on the recommended content adjustment page, wherein the adjustment panel is provided with a plurality of recommendation level UI controls respectively corresponding to a plurality of recommendation strength levels;

in response to receiving, via the GUI, a selection operation for a recommendation level UI control corresponding to a target recommendation strength level in the plurality of recommendation strength levels, establishing a correspondence between the target content type tag and the target recommendation strength level, based on the target recommendation strength level, automatically adjusting the recommendation amount for a content type corresponding to the target content type tag among content to be recommended by the target application, and pushing a corresponding amount of recommended content to a user based on the adjusted recommendation amount;

in response to receiving, via the GUI, a triggering operation for a preset first tag addition UI control on the recommended content adjustment page, displaying a tag selection page, wherein a preset number of content type tags are displayed on the tag selection page; and receiving via the GUI at least one content type tag selected on the tag selection page, and adding the at least one content type tag and a corresponding adjustment entry UI control to the first adjustment page;

the method further comprises:

after displaying the recommended content adjustment page of the target application, in response to receiving via the GUI a triggering operation for a preset first UI control on the recommended content adjustment page, jumping from the recommended content adjustment page to a first adjustment page, and displaying, on the first adjustment page, the content type tag that has been adjusted and the recommendation strength level corresponding to the content type tag;

in response to receiving via the GUI a triggering operation for a preset second UI control on the first adjustment page, restoring the recommendation strength level corresponding to each content type tag displayed on the first adjustment page to a default level; and in response to that the recommendation strength level corresponding to each content type tag displayed on the first adjustment page is restored to the default level, performing at least one of the followings:

displaying prompt information on the first adjustment page, wherein the prompt information represents that there is no content yet; or making the preset second UI control grayed out.

12. The data processing device according to claim 11, wherein when the processor executes the instruction, the following operations are further implemented:

after establishing, in response to receiving via the GUI a selection operation for a recommendation level UI control corresponding to a target recommendation strength level in the plurality of recommendation strength levels, a correspondence between the target recommendation strength level and the target content type tag, closing the adjustment panel corresponding to the target content type tag; and displaying the correspondence between the target content type tag and the target recommendation strength level on the recommended content adjustment page.

13. The data processing device according to claim 11, wherein the content type tag displayed on the first adjustment page is each provided with an adjustment entry UI control, and the adjustment entry UI controls are control is used to update the recommendation strength level of the content type tag corresponding to the adjustment entry UI control.

* * * * *